(12) United States Patent
Zhu

(10) Patent No.: US 9,301,352 B2
(45) Date of Patent: Mar. 29, 2016

(54) METHOD AND CIRCUIT FOR DRIVING AN LED LOAD WITH PHASE-CUT DIMMERS

(71) Applicant: NXP B.V., Eindhoven (NL)

(72) Inventor: Yan Zhu, Cary, NC (US)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/210,144

(22) Filed: Mar. 13, 2014

(65) Prior Publication Data

US 2014/0300289 A1    Oct. 9, 2014

Related U.S. Application Data

(60) Provisional application No. 61/808,496, filed on Apr. 4, 2013.

(51) Int. Cl.
H05B 37/02    (2006.01)
H05B 33/08    (2006.01)

(52) U.S. Cl.
CPC ............ *H05B 33/0815* (2013.01); *H05B 37/02* (2013.01)

(58) Field of Classification Search
CPC .............................. H05B 33/08; H05B 37/02
USPC ............. 315/200 R, 206, 224, 247, 287, 294, 315/299, 302, 307
See application file for complete search history.

(56) References Cited

U.S. PATENT DOCUMENTS

| | | | | |
|---|---|---|---|---|
| 2010/0213859 A1* | 8/2010 | Shteynberg | ........ | H05B 33/0815 315/224 |
| 2012/0286696 A1* | 11/2012 | Ghanem | ........................ | 315/291 |
| 2013/0057167 A1* | 3/2013 | Angeles | ..................... | 315/200 R |
| 2013/0127353 A1* | 5/2013 | Athalye | ............. | H05B 33/0815 315/193 |
| 2013/0181624 A1* | 7/2013 | Kang | ......................... | 315/200 R |
| 2013/0257302 A1* | 10/2013 | Canter | ............... | H05B 33/0815 315/200 R |
| 2013/0285563 A1* | 10/2013 | Iwai | ........................ | H05B 37/02 315/185 R |

* cited by examiner

*Primary Examiner* — Tung X Le

(57) ABSTRACT

Embodiments of a dimmable driver circuit for a light-emitting diode (LED) load and a method for driving an LED load are described. In one embodiment, a dimmable driver circuit for an LED load includes an alternating current (AC)-direct current (DC) rectifier configured to convert an AC input voltage into a DC voltage, a damper and filter circuit configured to provide a latching current to a phase-cut dimmer and to suppress an inrush current caused by phase-cut dimming, and to filter electromagnetic interference (EMI) noise from the DC voltage, and a switching converter circuit connected to the damper and filter circuit and configured to operate in a boundary conduction mode (BCM) with a constant on-time to generate DC power for the LED load in response to the DC voltage. Other embodiments are also described.

18 Claims, 9 Drawing Sheets

METHOD AND CIRCUIT FOR DRIVING AN LED LOAD WITH PHASE-CUT DIMMERS

This application claims priority from U.S. Provisional Application No. 61/808,496, filed Apr. 4, 2013, which provisional application is incorporated herein by reference in its entirety.

Embodiments of the invention relate generally to electronic hardware and methods for operating electronic hardware, and, more particularly, to dimmable LED driver circuits and methods for driving LED loads.

Light-emitting diodes (LEDs) are widely used in light applications as light sources. Driver circuits are used to provide proper voltage and current to LEDs according to specific requirements of a particular application. To conserve power and/or create special light effects, phase-cut dimmers are used to reduce or cut-off the power that is supplied to such dimmable LEDs.

Conventional LED drive circuits rely on additional circuit components to accommodate dimmers (e.g., Triac (Triode for alternating current) dimmers and Transistor dimmers), and typically cannot drive an LED load cost-effectively. To provide appropriate current to keep Triac dimmers on, some conventional LED drive circuits use dedicated bleeder resistors placed in parallel with voltage supplies (e.g., coupled in parallel with a DC power supply voltage after an input rectifier) to provide dedicated latching and holding current. However, for such LED drive circuits, the bleeding loss is not optimal and the hard switching of bleeder resistors can cause a transient current and EMI noise. Some conventional LED drive circuits rely on external bleeding current. Although these LED drive circuits may have optimal bleeding power dissipation and good dimmer support, these LED driver circuits require additional power transistors and associated components, which can be costly to retrofit low power lamps. In addition, some conventional LED drive circuits use a dedicated boost converter in addition to a main converter to provide additional latching and holding current. But the additional boost converter adds cost and reduces the overall efficiency of the driver circuits. Some conventional LED drive circuits use a buffer capacitor of a boost stage to block any misfiring of dimmers. However, these LED drive circuits require additional power conversion stages. The additional power conversion stages add component cost and increase the board space, making these LED drive circuits undesirable for small retrofit bulb applications. Further, some conventional LED drive circuits use Resistor-Capacitor (RC) branches to provide latching current. However, the RC branches add additional component costs and the LED drive circuits do not have a stable deep dimming. Therefore, it is desirable to effectively drive an LED load without additional circuit components such as a bleeder circuit or an RC circuit.

Embodiments of a dimmable driver circuit for a light-emitting diode (LED) load and a method for driving an LED load are described. In one embodiment, a dimmable driver circuit for an LED load includes an alternating current (AC)-direct current (DC) rectifier configured to convert an AC input voltage into a DC voltage, a damper and filter circuit configured to provide a latching current to a phase-cut dimmer and to suppress an inrush current caused by phase-cut dimming, and to filter electromagnetic interference (EMI) noise from the DC voltage, and a switching converter circuit connected to the damper and filter circuit and configured to operate in a boundary conduction mode (BCM) with a constant on-time to generate DC power for the LED load in response to the DC voltage. Compared to a conventional LED circuit with a dedicated bleeder circuit or an RC circuit, the dimmable driver circuit provides enough current to keep a phase-cut dimmer turned on while effectively driving the LED load without requiring additional circuit components, such as a bleeder circuit or an RC circuit. Other embodiments are also described.

In one embodiment, a dimmable driver circuit for an LED load includes an AC-DC rectifier configured to convert an AC input voltage into a DC voltage, a damper and filter circuit configured to provide a latching current to a phase-cut dimmer and to suppress an inrush current caused by phase-cut dimming, and to filter EMI noise from the DC voltage, and a switching converter circuit connected to the damper and filter circuit and configured to operate in a BCM with a constant on-time to generate DC power for the LED load in response to the DC voltage.

In one embodiment, a method for driving an LED load involves converting an AC input voltage into a DC voltage, providing a latching current to turn on a phase-cut dimmer for phase-cut dimming, suppressing an inrush current caused by the phase-cut dimming, filtering EMI noise from the DC voltage, and operating a switching converter in a BCM with a constant on-time to generate DC power for the LED load in response to the DC voltage.

In one embodiment, a dimmable driver circuit for an LED load includes an AC-DC rectifier configured to convert an AC input voltage into a DC voltage, a damper circuit connected to the AC-DC rectifier and configured to provide a latching current to a phase-cut dimmer and to suppress an inrush current caused by phase-cut dimming, an EMI filter configured to filter electromagnetic interference noise from the DC voltage, a switching converter configured to convert the DC voltage from one DC voltage level to another DC voltage level, and a switching converter controller connected to the EMI filter and to the switching converter and configured to cause the switching converter to operate in a BCM with the constant on-time.

Other aspects and advantages of embodiments of the present invention will become apparent from the following detailed description, taken in conjunction with the accompanying drawings, depicted by way of example of the principles of the invention.

FIG. 1 is a schematic block diagram of an electrical device in accordance with an embodiment of the invention.

FIGS. 2(A), 2(B), 2(C) depict some examples of an AC input voltage that is input to the electrical device depicted in FIG. 1 and an intermediate AC voltage that is generated by a dimmer circuit of the electrical device depicted in FIG. 1.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
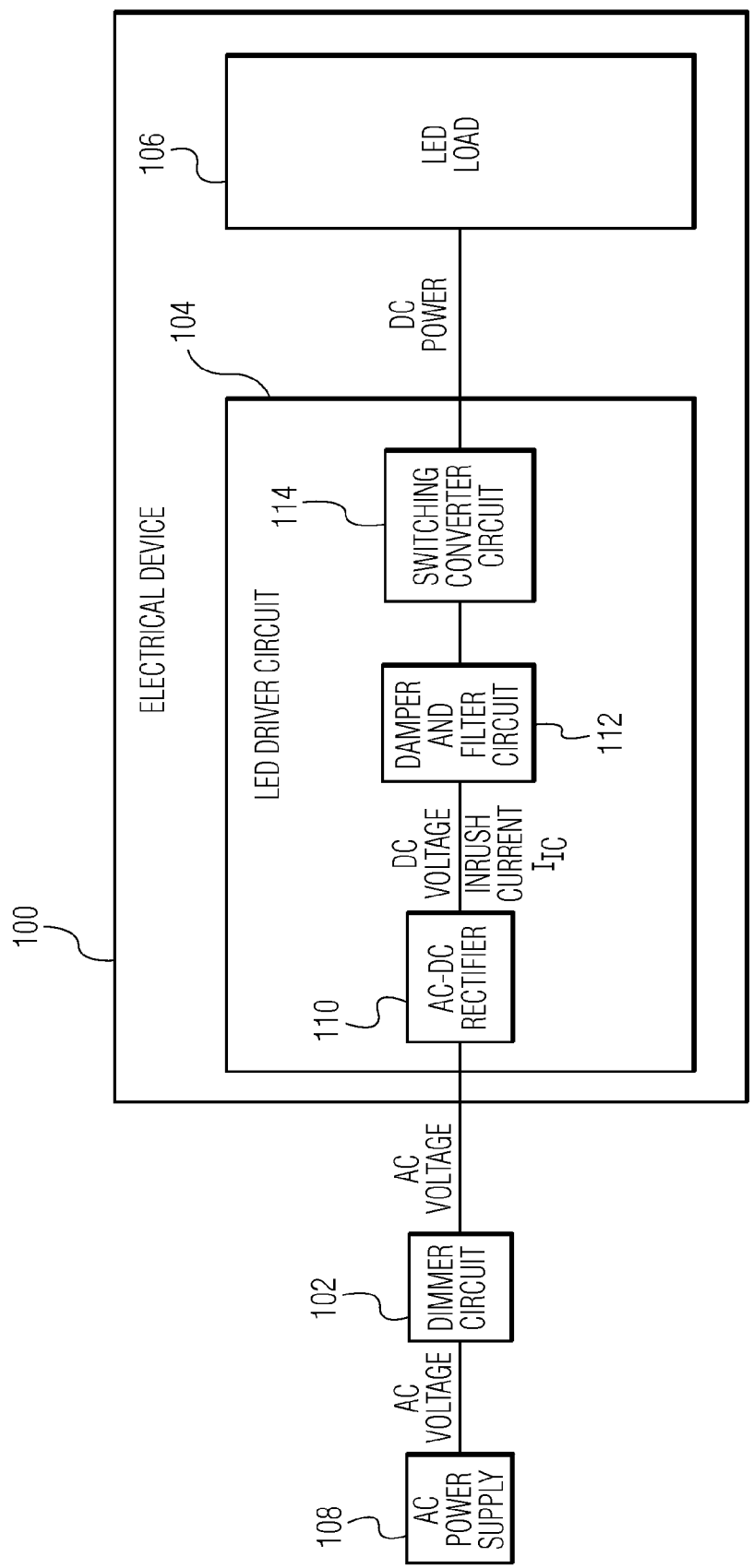

FIG. 1 is a schematic block diagram of an electrical device 100 in accordance with an embodiment of the invention. In the embodiment depicted in FIG. 1, the electrical device includes an LED driver circuit 104 and an LED load 106. The electrical device can be used in various applications, such as industrial applications and/or consumer or appliance applications. In some embodiments, the electrical device works with a mains input voltage (e.g., 90V nominal and 120V nominal) and LED lamps with an input power of about 4.5 Watts and above. Although the electrical device 100 is shown in FIG. 1 as including certain components, in some embodiments, the electrical device includes less or more components to implement less or more functionalities.

The electrical device 100 is powered by an AC input voltage that is generated by an AC power supply 108 through a dimmer circuit 102. The AC power supply may generate an input AC voltage in a voltage range of between 90V and 120V and a frequency range between 50 Hz and 60 Hz. For example, the AC power supply is typically the power provided within a residential or commercial building. In some embodiments, the electrical device 100 includes one or more power supply interfaces that interface with the AC power supply.

The dimmer circuit 102 is used to control the power supplied to the LED driver circuit 104 and/or the LED load 106. The dimmer circuit can reduce or increase the light intensity of light generated by the LED load. For example, the dimmer circuit reduces, cuts off, or increases the supplied power to the LED driver circuit to reduce, cut off, or increase the intensity of light generated by the LED load. The dimmer circuit can transform the AC input voltage from the AC power supply 108 into an intermediate AC voltage, which is output to the LED driver circuit. The intermediate AC voltage typically has a magnitude that is the same as, or smaller than, the magnitude of the AC input voltage from the AC power supply. The dimmer circuit may include a Triac device, a transistor circuit, or any other suitable switching component that is known in the art.

Figure 2A:
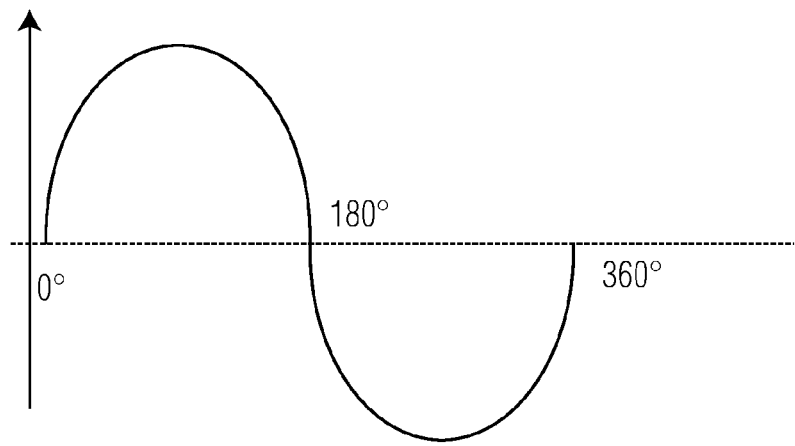
Figure 2B:
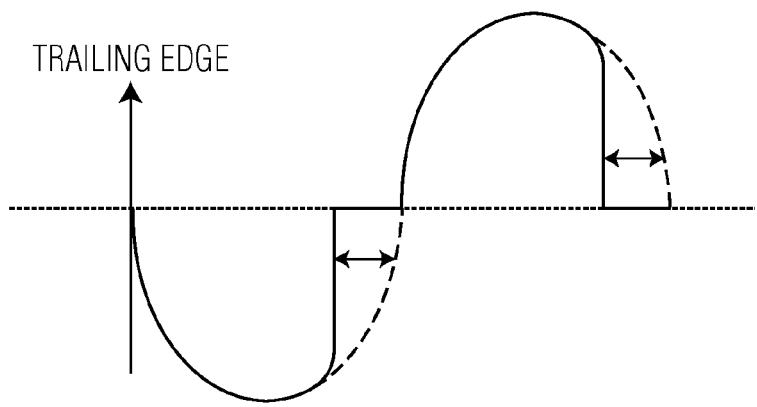
Figure 2C:
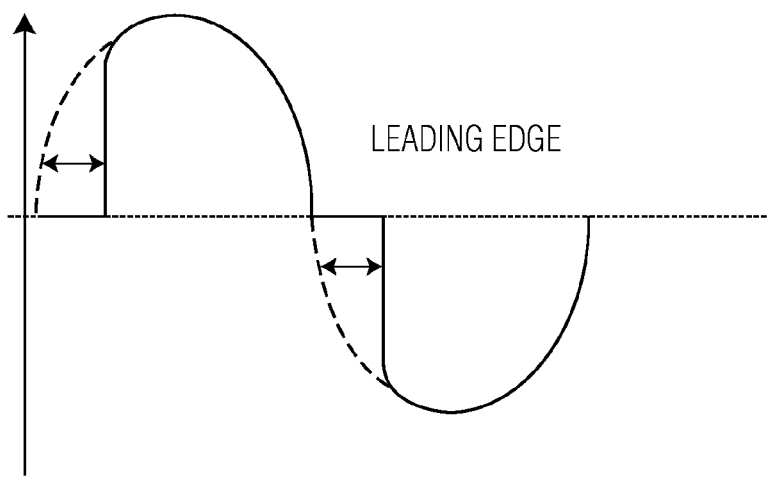

In some embodiments, the dimmer circuit 102 is a phase-cut dimmer, which can cut-off a part of the AC input signal from the AC power supply 108. Consequently, the power supplied to the LED load 106 and the brightness of light generated from the LED load can be controlled by the phase-cut dimmer circuit. Depending on the cut-off location at the AC waveform, a phase-cut dimmer may be a leading edge dimmer or a trailing edge dimmer. FIGS. 2(A), 2(B), 2(C) depict some examples of the AC input voltage from the AC power supply 108 and the intermediate AC voltage that is generated by the dimmer circuit 102. Specifically, FIG. 2(A) depicts an example of the AC input voltage from the AC power supply. FIG. 2(B) depicts an example of the intermediate AC voltage that is generated by a trailing edge dimmer. As shown in FIG. 2(B), the cut-off of the AC voltage is towards the end of the sine AC waveform. FIG. 2(C) depicts an example of the intermediate AC voltage that is generated by a leading edge dimmer. As shown in FIG. 2(C), the cut-off of the AC voltage is towards the beginning of the sine AC waveform.

Figure 3:
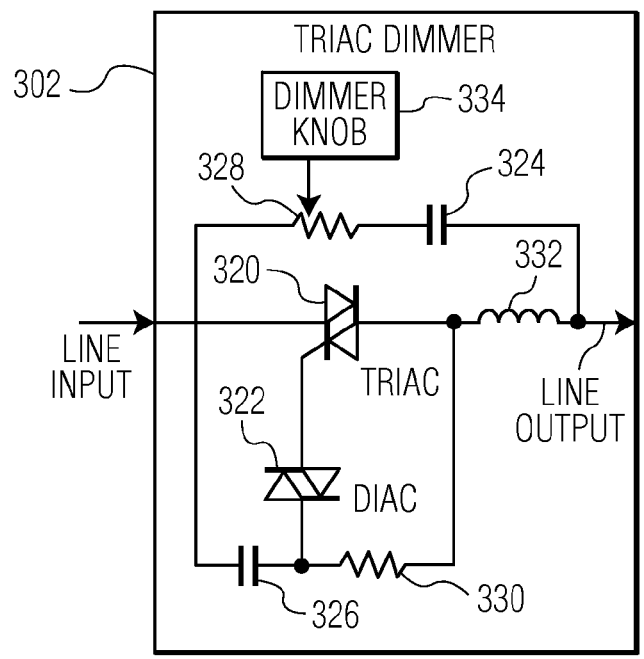
FIG. 3 depicts an embodiment of a Triac dimmer.

The dimmer circuit 102 may be a Triac dimmer, which is a leading edge dimmer, or a transistor dimmer, which is a trailing edge dimmer. A Triac phase-cut dimmer is made of a Triac (the bi-directional Thyristor), which is a low-cost and robust electronic switch. FIG. 3 depicts an embodiment of a Triac dimmer. In the embodiment depicted in FIG. 3, the Triac dimmer 302 includes a Triac 320, a diode for alternating current (Diac) 322, capacitors 324, 326, resistors 328, 330, and an inductor 332. The Triac dimmer 302 generates a delayed turn-on signal for the Triac 320 by changing the resistance value of the resistor 328 thru a dimmer knob or slider 334. Once the voltage across the capacitor 326 is higher than a threshold voltage, the Diac is turned on, which triggers on the Triac. Consequently, the output voltage of the Triac dimmer 302 is phase-cut by a certain angle. In order to have a reliable operation, the Triac needs a minimum current flowing through the Triac to cause the Triac to turn on (e.g., the latching current), and a minimum current to cause the Triac to stay on (e.g., the hold current). For most 120V dimmers, the required hold current is up to 20 mA and for most 230V dimmers, the required hold current can be up to 50 mA. The latching current is typically about 1.5 times the hold current.

Figure 4:
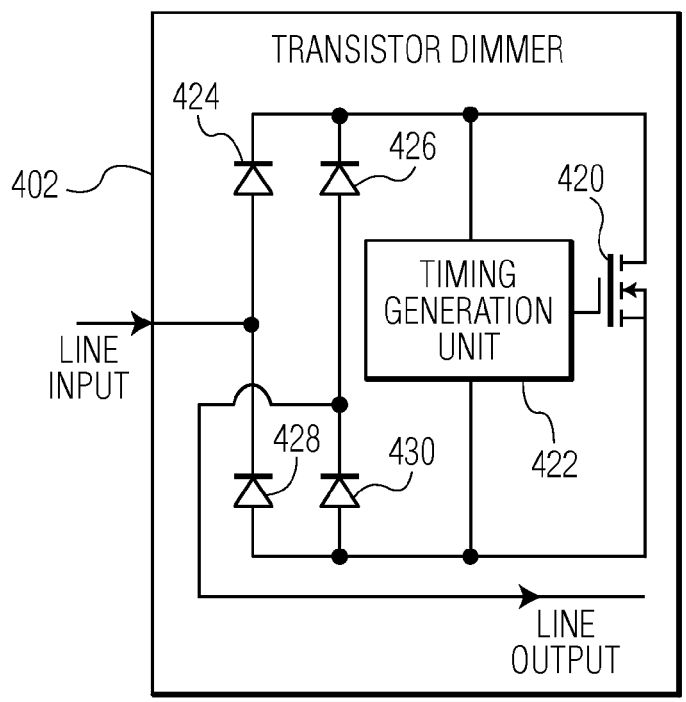
FIG. 4 depicts an embodiment of a transistor dimmer.

A transistor phase-cut dimmer uses an MOSFET to cut-off the AC power supplied to the LED driver circuit 104 and/or to the LED load 106. FIG. 4 depicts an embodiment of a transistor dimmer. In the embodiment depicted in FIG. 4, the transistor dimmer 402 includes an MOSFET 420, a timing generation unit 422 and diodes 424, 426, 428, 430. The transistor dimmer 402 uses the MOSFET 420 to turn off the line voltage as needed at a certain phase angle, which is determined by the position of a dimmer knob or slider. Consequently, the output voltage of the transistor dimmer 402 has a phase-cut on the trailing edge. The gating signal of the MOSFET is generated by the timing generation unit 422. When the MOSFET cuts off the input voltage, the LED driver has to bleed a small biasing current to bring down the dimmer output voltage to zero.

Turning back to FIG. 1, the LED driver circuit 104 is configured to generate DC power for driving the LED load 106 in response to the AC input voltage from the AC power supply 108. In the embodiment depicted in FIG. 1, the LED driver circuit includes an AC-DC rectifier 110, a damper and filter circuit 112, and a switching converter circuit 114.

The AC-DC rectifier 110 is configured to transform an AC input voltage into a DC voltage for other components of the LED driver circuit 104. The AC-DC rectifier can work with standard voltages in various countries and regions, including North America, Europe, Middle East, Central America and the Caribbean, South America, Africa, Australia and Oceania. In an embodiment, the AC to DC rectifier can transform an input AC voltage (e.g., between 90V and 240V) into a DC voltage.

Phase-cut dimming that is performed by the dimmer circuit 102 causes fast transient current changes on the DC voltage and generates an inrush current, "$I_{IC}$," that has a high peak value, which can cause damage (e.g., overheating, overloading) to the dimmer circuit or trigger a utility fuse box. The damper and filter circuit 112 limits the inrush current, "$I_{IC}$," caused by the phase-cut dimming to an acceptable level without damaging the dimmer or triggering a fuse box during the phase-cut transient. The damper and filter circuit is configured to provide a latching current to the phase-cut dimmer 102 and to suppress the inrush current, "$I_{IC}$," caused by phase-cut dimming. In addition, the damper and filter circuit is configured to filter electromagnetic interference (EMI) noise from the DC voltage. Compared to a conventional LED circuit with a dedicated bleeder circuit or an RC circuit, the LED driver circuit 104 provides enough latching current to keep a phase-cut dimmer turned on while effectively driving the LED load without requiring a bleeder circuit or an RC circuit. In some embodiments, the damper and filter circuit includes an EMI filter configured to filter EMI noise from the DC voltage (i.e., preventing the EMI noise from polluting the power grid) and a damper circuit configured to suppress the inrush current, "$I_{IC}$," caused by the dimmer circuit 102.

The switching converter circuit 114 is connected to the damper and filter circuit 112 and is configured to operate in a boundary conduction mode (BCM) with a constant on-time. In an embodiment, the BCM operation of the switching converter circuit corresponds to the mode where an inductor current of the switching converter circuit follows a triangular shape in which the inductor current rises from zero in each switching cycle, and then falls as the stored energy in an inductive component of the switching converter circuit is discharged. Compared to a continuous conduction mode (CCM) in which the inductor current is continuous, a new switching period is initiated in BCM when the inductor current returns to zero, which is at the boundary of the continuous conduction mode (CCM) and the discontinuous conduction mode (DCM). In an embodiment, the switching converter circuit 114 operates with a fixed or constant on time. Because of the constant-on time BCM operation, the switching converter circuit draws a smooth quasi-sinusoidal input current that tracks the input voltage with little phase-shift. Consequently, the hold current for the dimmer circuit 102 can be maximized and the LED driver circuit can provide better support for the dimmer circuit without the need for a bleeder circuit or an RC circuit. In some embodiments, the switching converter circuit includes a switching converter and a controller configured to control the switching converter. A switching converter is a switch-mode DC to DC converter that converts one DC voltage to another DC voltage. The switching converter can be a buck converter, a buck/boost converter or a flyback converter.

Figure 5:
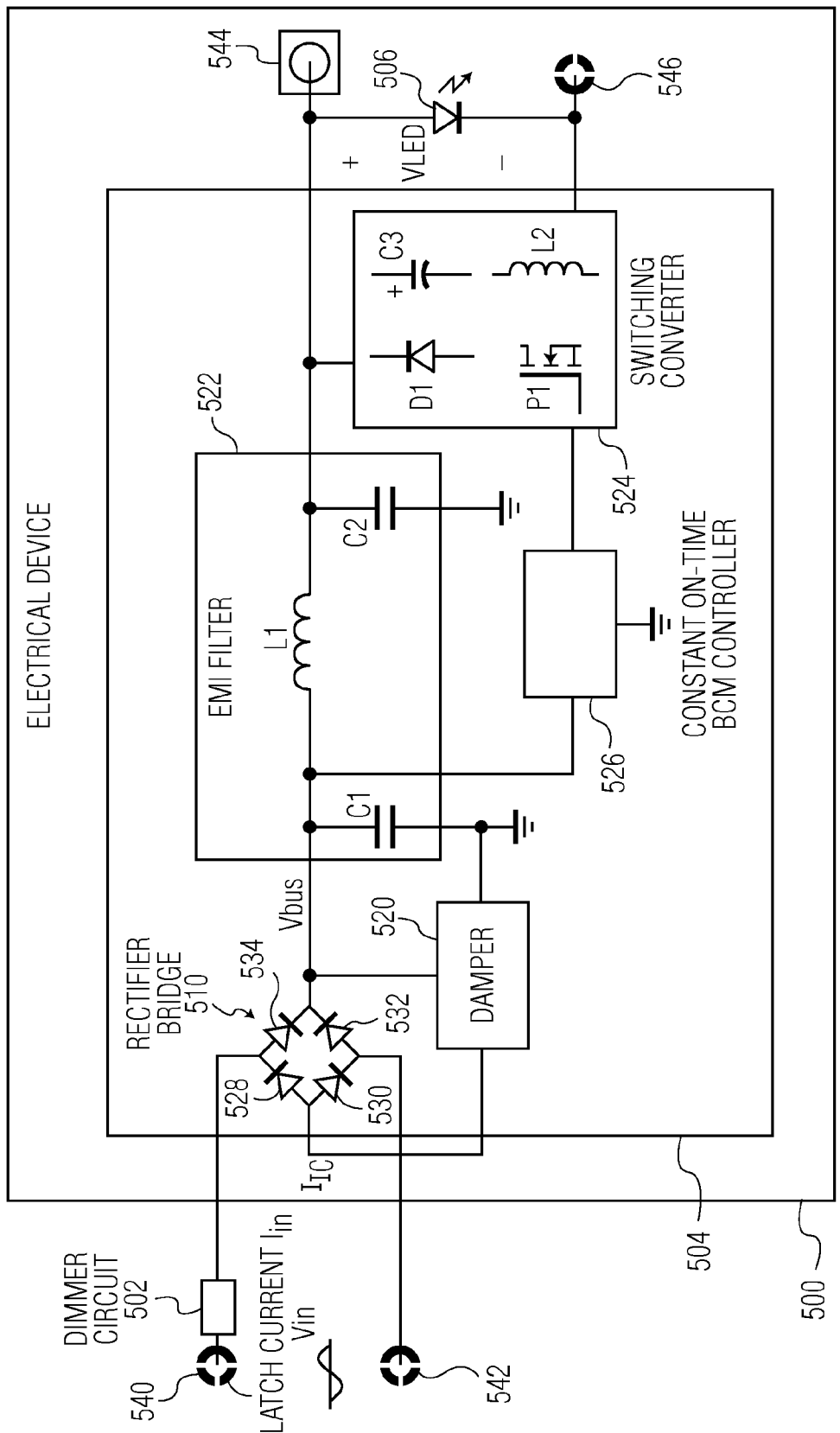
FIG. 5 depicts an embodiment of the electrical device depicted in FIG. 1.

FIG. 5 depicts an embodiment of the electrical device 100 depicted in FIG. 1. In the embodiment depicted in FIG. 5, an electrical device 500 includes an LED driver circuit 504, an LED load 506, and output terminals 544, 546. The electrical device 500 depicted in FIG. 5 is one possible embodiment of the electrical device 100 depicted in FIG. 1. However, the electrical device 100 depicted in FIG. 1 is not limited to the embodiment shown in FIG. 5. For example, although the LED load 506 is shown in FIG. 5 as including one light emitting diode, in other embodiments, the LED load 506 includes multiple light emitting diodes.

A phase-cutting dimmer circuit 502 is used to control the power supplied to the LED driver circuit 504 and/or to the LED load 506. In the embodiment depicted in FIG. 5, the dimmer circuit 502 is connected between input terminals 540, 542, into which an AC signal with a voltage, "$V_{in}$," and a current, "$I_{in}$," is input, and the LED driver circuit 504. The dimmer circuit 502 may be the same as or similar to the dimmer circuit 102 depicted in FIG. 1.

In the embodiment depicted in FIG. 5, the LED driver circuit 504 includes a rectifier bridge 510, a damper circuit 520, an EMI filter 522, a switching converter 524, and a switching converter controller 526. The rectifier bridge 510 is configured to transform an AC input voltage from the dimmer circuit 502 into a DC voltage for other components of the LED driver circuit 504. As shown in FIG. 5, the rectifier bridge 510 includes diodes 528, 530, 532, 534. The rectifier bridge 510 is an embodiment of the AC-DC rectifier 110 depicted in FIG. 1. However, the AC-DC rectifier 110 depicted in FIG. 1 can be implemented by other types of rectifiers.

The damper circuit 520 is configured to suppress an inrush current, "$I_{IC}$," caused by the dimmer circuit 502. The damper circuit may be a resistor damper or an active damper. A resistor damper includes one or more resistors and an active damper may include a resistor that is connected in parallel with a switch, such as a timing shunt switch. The resistance value of the damper circuit 520 can be chosen such that the inrush current peak caused by the dimmer circuit 502 is limited within a threshold value that does not damage the dimmer circuit 502, the LED driver circuit 504, or the LED load 506. The EMI filter 522 is configured to filter EMI noise from polluting the power line. In the embodiment depicted in FIG. 5, the EMI filter includes capacitors, "C1," "C2," and an inductor, "L1."

In an embodiment, the damper circuit 520 together with the EMI filter 522 limit the inrush current, "$I_{IC}$," caused by the phase-cut dimming performed by the dimmer circuit 502, and at the same time provide the required latching current, "Iin," for the dimmer circuit 502. A latching current is the minimum current required to turn on, for example, a Triac or a silicon-controlled rectifier (SCR) of the dimmer circuit. Because the damper circuit can limit the inrush current, "$I_{IC}$," caused by the dimming and because the damper circuit and the EMI filter can simultaneously provide the required latching current for the dimmer circuit 502, additional dedicated RC circuitry is not required to generate the latching current for the dimmer circuit 502. The capacitance value of the EMI capacitor, "C1," and the damper resistance value can be chosen such that the inrush current, "$I_{IC}$," in the DC voltage that is caused by the dimmer circuit 502 is limited. In some embodiments, the resistance value of the damper is set to a resistance value of between 120 ohm and 200 ohm. In addition, the capacitance value of the EMI capacitor, "C1," and the damper resistance value can be chosen such that the charging current in the capacitor, "C1," provides enough latching current required to turn on the dimmer circuit for at least a minimum duration.

In an embodiment, the switching converter 524 is a switch-mode DC to DC converter that converts one DC voltage level to another DC voltage level. In the embodiment depicted in FIG. 5, the switching converter includes a diode, "D1," a power transistor, "P1," an inductor, "L2," and a capacitor, "C3." The switching converter controller 526 controls the operation of the switching converter 524. In the embodiment depicted in FIG. 5, the switching converter controller 526 controls the switching converter 524 to operate in a boundary conduction mode (BCM) with a constant on-time to generate DC power with a voltage, "$V_{LED}$," for the LED load 506 in response to the DC voltage, which is generated by the rectifier bridge 510.

An example of an operation of the switching converter 524 is described as follows. The switching converter 524 operates by turning on and off the power transistor, "P1," at a switching frequency, e.g., ranging from approximately 40 kHz to 200 kHz, set by the controller 526. When the power transistor, "P1," is turned on, the current in the inductor, "L2," increases and the inductor, "L2," gets energized. After a short time interval set by the switching converter controller 526, the power transistor, "P1," is turned off and the inductor, "L2," gets demagnetized thru the diode, "D1." After another time interval, which is determined by the switching converter controller 526 (when detecting the inductor current drops to zero), the power transistor, "P1," is turned on again, at which point another switching cycle starts and the process repeats. The capacitor, "C3," filters out the ripples of the DC voltage and provides a relatively constant DC power for the LED load 506. Depending on the specific connections of the switching converter, a charging current is delivered to the LED load 506 during the time when the power transistor, "P1," is on and/or off.

Figure 6:
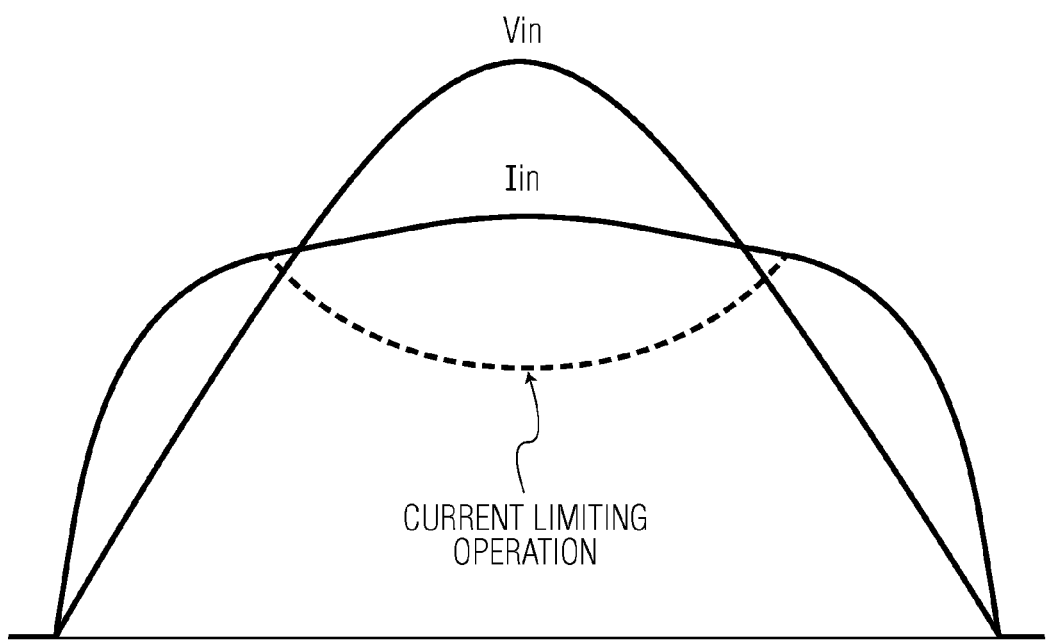
FIG. 6 depicts an example of an input voltage curve and an input current curve of the electrical device depicted in FIG. 5.

FIG. 6 depicts an example waveform of the input voltage, "$V_{in}$," and the input current, "$I_{in}$," of the electrical device 500. Once the dimmer circuit 502 is triggered on, the switching converter 524 provides the required hold current for the dimmer circuit 502. Because of the constant-on time BCM operation, the switching converter draws a smooth quasi-sinusoidal input current tracking the input voltage with little phase-shift, as shown in FIG. 6. The input current, "$I_{in}$," extends higher in low input voltage, "$V_{in}$," regions, compared to a typical sinusoidal waveform. Consequently, the hold current for the dimmer circuit can be maximized. In addition, the LED driver circuit can operate in a current limiting (constant peak current) mode in the peak $V_{in}$ region, as illustrated by the dotted line in FIG. 6. Operating the LED driver circuit in the current limiting mode in the peak $V_{in}$ region can extend the "shoulder" of the current waveform toward the low Vin region, therefore providing more hold current for deep dimming. Consequently, the LED driver circuit 504 provides better support for the dimmer circuit 502 without the need for a bleeder circuit or an RC circuit. Additionally, a 90V-120V Triac dimmer typically requires low hold and latching current. Therefore, the LED driver circuit is sufficient to support 90V-120V dimmers without a bleeder circuit or an RC circuit.

Figure 7:
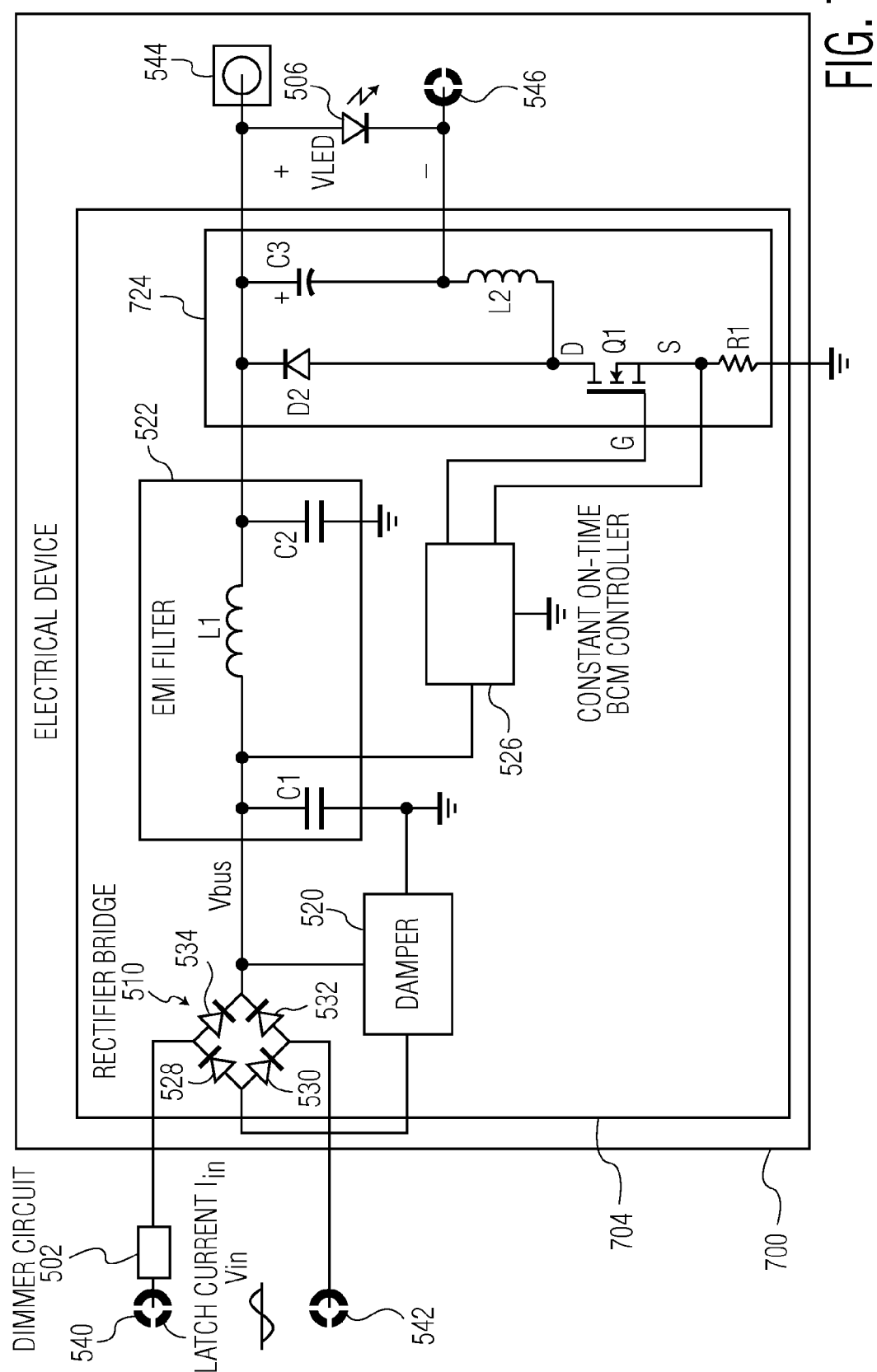
FIG. 7 depicts an electrical device having an LED driver circuit that includes a buck converter.
Figure 8:
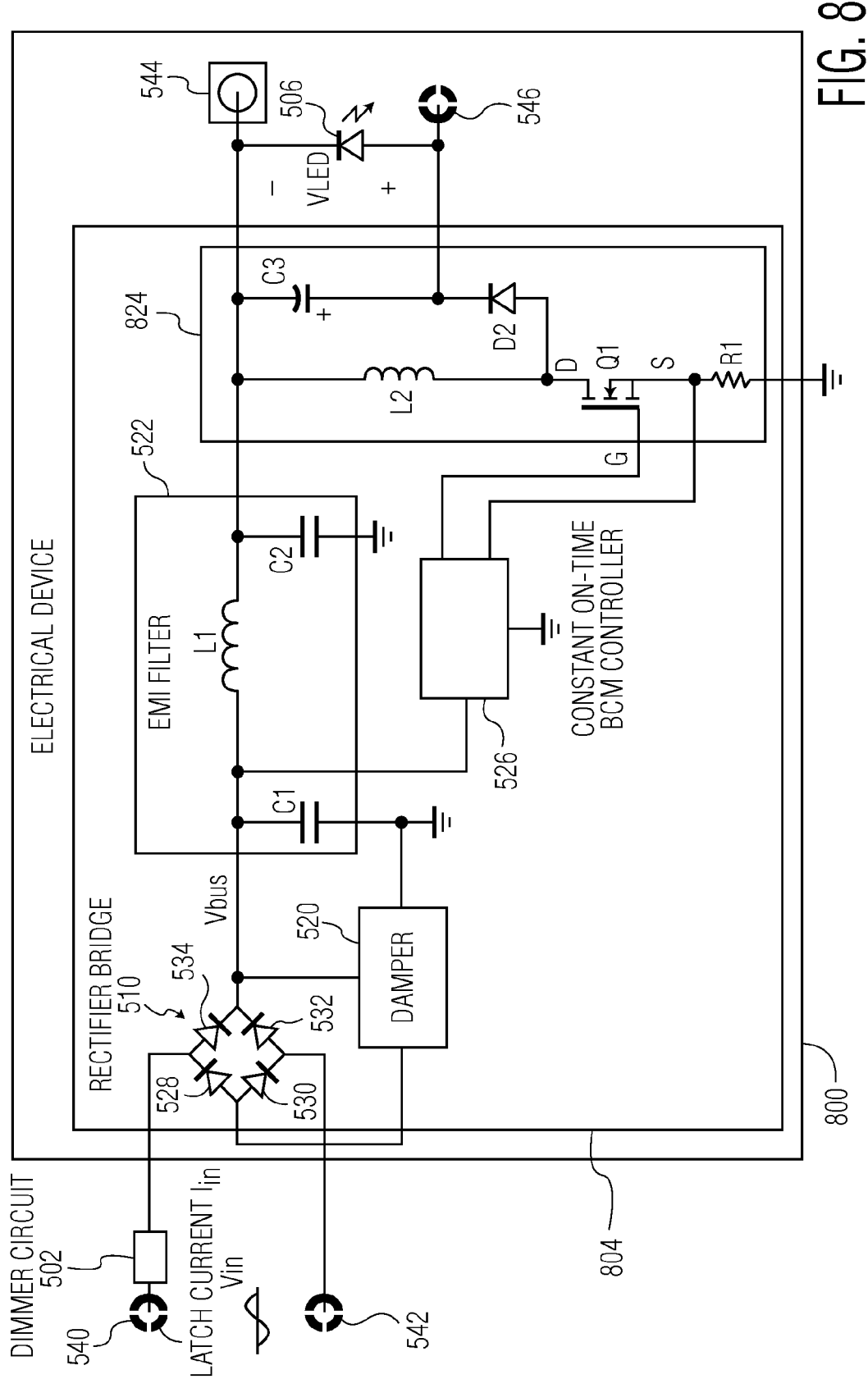
FIG. 8 depicts an electrical device having an LED driver circuit that includes a buck/boost converter.
Figure 9:
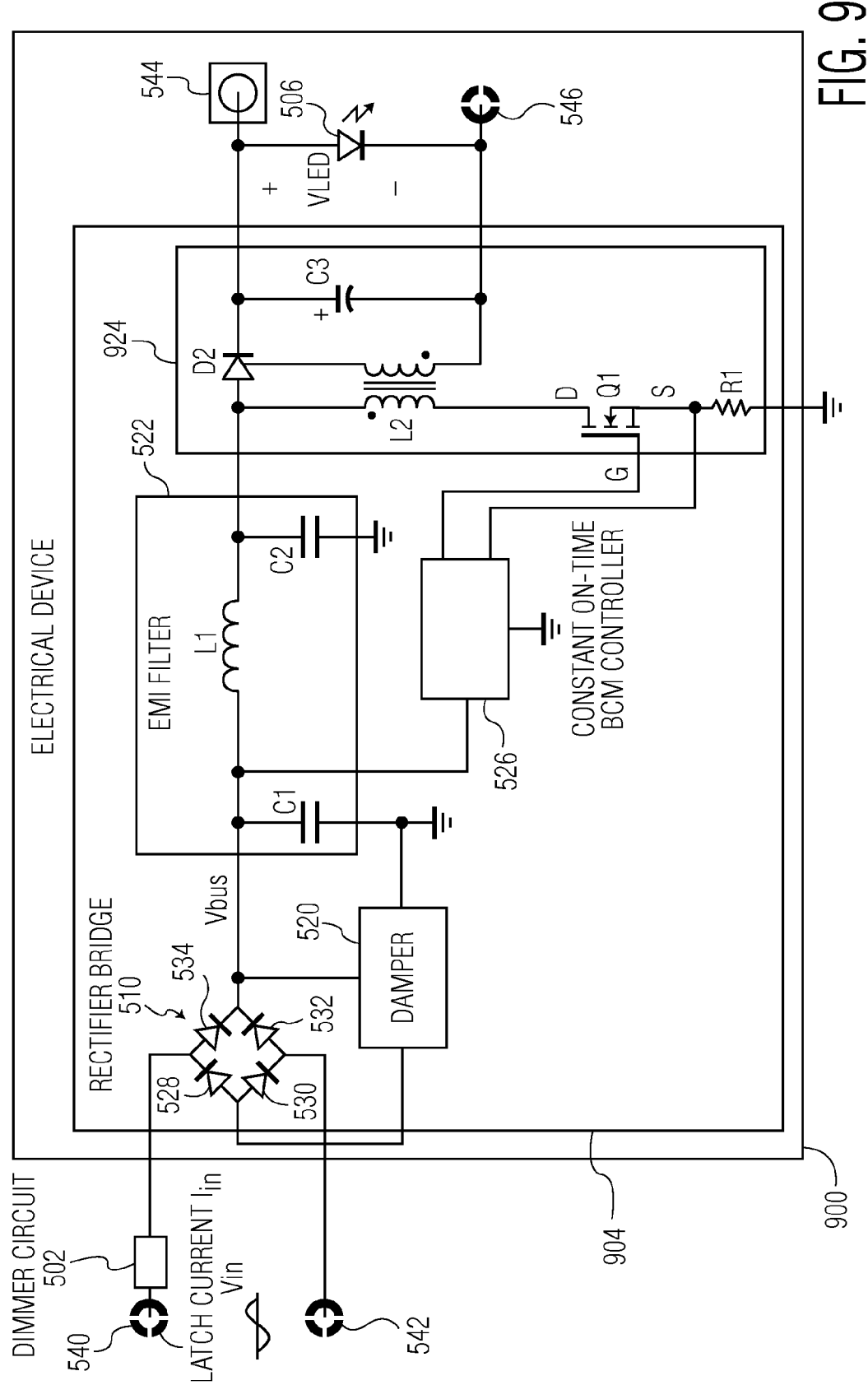
FIG. 9 depicts an electrical device having an LED driver circuit that includes a flyback converter.

In an embodiment, the switching converter 524 is a buck converter, a buck/boost converter, or a flyback converter. FIGS. 7-9 depict three embodiments of the electrical device 500 depicted in FIG. 5 that utilize a buck converter, a buck/boost converter, or a flyback converter. Specifically, FIG. 7 depicts an electrical device 700 having an LED driver circuit 704 that includes a buck converter 724. In the embodiment depicted in FIG. 7, the buck converter includes the diode, "D1," an NMOS transistor, "Q1," the inductor, "L2," the capacitor, "C3," and a resistor, "R1." The switching converter controller 526 controls the gate terminal, "G," of the NMOS transistor, "Q1." The drain terminal, "D," of the NMOS transistor, "Q1" is connected to the diode, "D1," and the inductor, "L2." The source terminal, "S," of the NMOS transistor, "Q1" is connected to the resistor, "R1." The capacitor, "C3," is connected in parallel with the LED load 506. In the embodiment depicted in FIG. 7, the inductor, "L2," is connected to the output terminal 546 and the diode, "D1," is connected to the output terminal 544. The damper circuit 520 is connected in series with the power path, which goes from the rectifier bridge 510, to the inductor, "L1," to the LED load 506, to the inductor, "L2," to the NMOS transistor, "Q1," to the resistor, "R1," to the damper circuit 520, and to the rectifier bridge 510.

FIG. 8 depicts an electrical device 800 having an LED driver circuit 804 that includes a buck/boost converter 824. In the embodiment depicted in FIG. 8, the buck/boost converter includes the diode, "D1," the NMOS transistor, "Q1," the inductor, "L2," the capacitor, "C3," and the resistor, "R1." The switching converter controller 526 controls the gate terminal, "G," of the NMOS transistor, "Q1." The drain terminal, "D," of the NMOS transistor, "Q1" is connected to the diode, "D1," and the inductor, "L2." The source terminal, "S," of the NMOS transistor, "Q1" is connected to the resistor, "R1." The capacitor, "C3," is connected in parallel with the LED load 506. In the embodiment depicted in FIG. 8, the inductor, "L2," is connected to the output terminal 544 and the diode, "D1," is connected to the output terminal 546. The damper circuit 520 is connected in series with the power path, which goes from the rectifier bridge 510, to the inductor, "L1," to the inductor, "L2," to the NMOS transistor, "Q1," to the resistor, "R1," to the damper circuit 520, and to the rectifier bridge 510.

FIG. 9 depicts an electrical device 900 having an LED driver circuit 904 that includes a flyback converter 924. In the embodiment depicted in FIG. 9, the flyback converter includes the diode, "D1," the NMOS transistor, "Q1," the inductor, "L2," which is implemented as a transformer, the capacitor, "C3," and the resistor, "R1." The switching converter controller 526 controls the gate terminal, "G," of the NMOS transistor, "Q1." The drain terminal, "D," of the NMOS transistor, "Q1" is connected to the inductor, "L2." The source terminal, "S," of the NMOS transistor, "Q1" is connected to the resistor, "R1." The capacitor, "C3," is connected in parallel with the LED load 506. In the embodiment depicted in FIG. 9, the damper circuit 520 is connected in series with the power path, which goes from the rectifier bridge 510, to the inductor, "L1," to the inductor, "L2," to the NMOS transistor, "Q1," to the resistor, "R1," to the damper circuit 520, and to the rectifier bridge 510.

Figure 10:
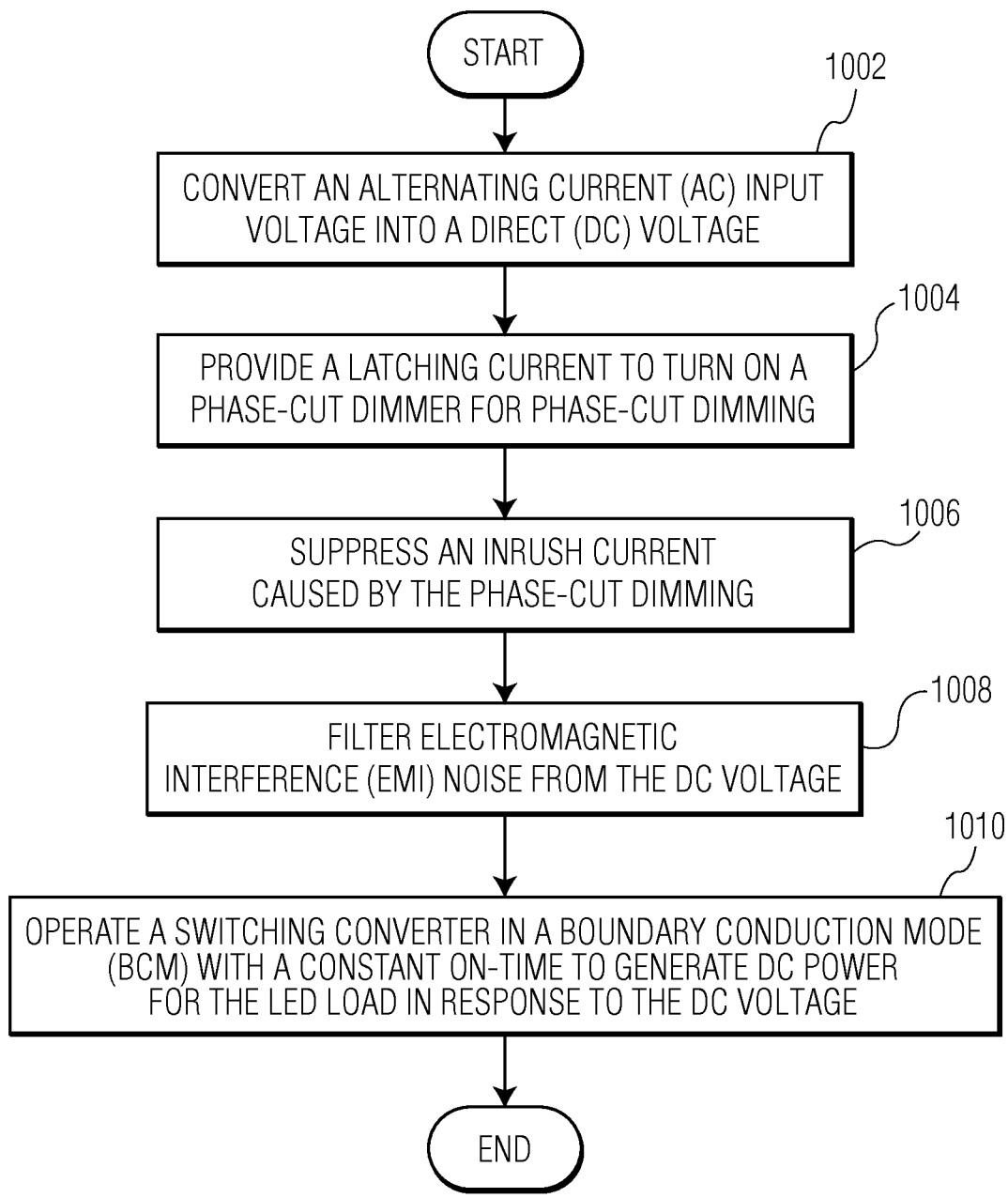
FIG. 10 is a process flow diagram that illustrates a method for driving an LED load in accordance with an embodiment of the invention.

FIG. 10 is a process flow diagram that illustrates a method for driving a light-emitting diode (LED) load in accordance with an embodiment of the invention. At block 1002, an AC input voltage is converted into a DC voltage. At block 1004, a latching current is provided to turn on a phase-cut dimmer for phase-cut dimming. At block 1006, an inrush current caused by the phase-cut dimming is suppressed. At block 1008, electromagnetic interference (EMI) noise from the DC voltage is filtered. At block 1010, a switching converter is operated in a boundary conduction mode (BCM) with a constant on-time to generate DC power for the LED load in response to the DC voltage.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A dimmable driver circuit for a light-emitting diode (LED) load, the dimmable driver circuit comprising:
   an alternating current (AC)-direct current (DC) rectifier configured to convert an AC input voltage into a DC voltage;
   a damper and filter circuit configured to provide a latching current to a phase-cut dimmer and to suppress an inrush current caused by phase-cut dimming, and to filter electromagnetic interference (EMI) noise from the DC voltage; and
   a switching converter circuit connected to the damper and filter circuit and configured to operate in a boundary conduction mode (BCM) with a constant on-time and a constant peak current to generate DC power for the LED load,
   wherein the switching converter draws a current from the AC input voltage, the current including a quasi-sinusoidal current waveform in a low voltage region of the AC input voltage and a second current waveform that is flatter than the quasi-sinusoidal current waveform in a high voltage region of the AC input voltage, wherein the quasi-sinusoidal current waveform extends higher in the low voltage region of the AC input voltage compared to a typical sinusoidal current waveform to support deep dimming, and wherein the switching converter comprises a buck converter.

2. The dimmable driver circuit of claim 1, wherein the damper and filter circuit comprises:
   an EMI filter configured to filter the electromagnetic interference noise for the switching converter circuit; and
   a damper circuit connected to the AC-DC rectifier and to the EMI filter.

3. The dimmable driver circuit of claim 2, wherein the damper circuit is a resistor damper or an active damper.

4. The dimmable driver circuit of claim 2, wherein the switching converter circuit comprises:
   a switching converter configured to convert the DC voltage from one DC voltage level to another DC voltage level; and
   a switching converter controller connected to the EMI filter and the switching converter and configured to cause the switching converter to operate in the BCM with the constant on-time.

5. The dimmable driver circuit of claim 4, wherein the switching converter circuit comprises:
   a diode connected to a first inductor of the damper and filter circuit and to a first capacitor of the damper and filter circuit;
   a transistor connected to the diode and to ground;
   a second capacitor connected in parallel with the LED load; and
   a second inductor connected to the second capacitor, to the LED load, and to the transistor,
   and wherein the EMI filter includes the first capacitor connected to the AC-DC rectifier, the damper circuit and ground, a third capacitor connected to the switching converter and ground, and the first inductor connected to the first and third capacitors.

6. The dimmable driver circuit of claim 5, wherein the transistor is an NMOS transistor, wherein the switching converter further comprises a resistor, wherein the switching converter controller controls a gate terminal of the NMOS transistor, wherein a drain terminal of the NMOS transistor is connected to the diode and the second inductor, wherein a source terminal of the NMOS transistor is connected to the resistor, and wherein the second capacitor is connected in parallel with the LED load.

7. The dimmable driver circuit of claim 6, wherein the switching converter is a buck converter or a buck/boost converter.

8. The dimmable driver circuit of claim 1, wherein the AC-DC rectifier comprises a rectifier bridge.

9. An electrical device comprising the dimmable driver circuit of claim 1 and the LED load of claim 1.

10. The electrical device of claim 9, wherein the phase-cut dimmer is a leading edge dimmer or a trailing edge dimmer.

11. The electrical device of claim 9, wherein the phase-cut dimmer is a Triode for Alternating Current (Triac) dimmer.

12. The dimmable driver circuit of claim 1, wherein the AC input voltage has a voltage range of between 90V and 120V.

13. The dimmable driver circuit of claim 1, wherein the dimmable driver circuit does not include a bleeder resistor that is coupled in parallel with an AC power supply from which the AC input voltage is outputted.

14. A method for driving a light-emitting diode (LED) load, the method comprising:
   converting an alternating current (AC) input voltage into a direct current (DC) voltage;
   providing a latching current to turn on a phase-cut dimmer for phase-cut dimming;
   suppressing an inrush current caused by the phase-cut dimming;
   filtering electromagnetic interference (EMI) noise from the DC voltage using an electromagnetic interference (EMI) filter; and
   operating a switching converter in a boundary conduction mode (BCM) with a constant on-time and a constant peak current to generate DC power for the LED load,
   wherein operating the switching converter in the boundary conduction mode (BCM) comprises drawing a current from the AC input voltage by the switching converter, the current including a quasi-sinusoidal current waveform in a low voltage region of the AC input voltage and a second current waveform that is flatter than the quasi-sinusoidal current waveform in a high voltage region of the AC input voltage, wherein the quasi-sinusoidal current waveform extends higher in the low voltage region of the AC input voltage compared to a typical sinusoidal current waveform to support deep dimming, and wherein the switching converter comprises a buck converter.

15. A dimmable driver circuit for a light-emitting diode (LED) load, the dimmable driver circuit comprising:
   an alternating current (AC)-direct current (DC) rectifier configured to convert an AC input voltage into a DC voltage;

a damper circuit connected to the AC-DC rectifier and configured to provide a latching current to a phase-cut dimmer and to suppress an inrush current caused by phase-cut dimming;

an electromagnetic interference (EMI) filter configured to filter electromagnetic interference noise from the DC voltage;

a switching converter configured to convert the DC voltage from one DC voltage level to another DC voltage level; and a switching converter controller connected to the EMI filter and to the switching converter and configured to cause the switching converter to operate in a boundary conduction mode (BCM) with the constant on-time and a constant peak current, wherein the switching converter draws a current from the AC input voltage, the current including a quasi-sinusoidal current waveform in a low voltage region of the AC input voltage and a second current waveform that is flatter than the quasi-sinusoidal current waveform in a high voltage region of the AC input voltage, wherein the quasi-sinusoidal current waveform extends higher in the low voltage region of the AC input voltage compared to a typical sinusoidal current waveform to support deep dimming, and wherein the switching converter comprises a buck converter.

16. The dimmable driver circuit of claim 15, wherein the switching converter circuit comprises:

a diode connected to a first inductor of the EMI filter and to a first capacitor of the EMI filter;

a transistor connected to the diode and to ground;

a second capacitor connected in parallel with the LED load; and a second inductor connected to the second capacitor, to the LED load, and to the transistor, and wherein the EMI filter includes the first capacitor connected to the AC-DC rectifier, the damper circuit and ground, a third capacitor connected to the switching converter and ground, and the first inductor connected to the first and third capacitors, wherein the transistor is an NMOS transistor.

17. The dimmable driver circuit of claim 16, wherein the switching converter controller controls a gate terminal of the NMOS transistor, wherein a drain terminal of the NMOS transistor is connected to the diode or the second inductor, wherein a source terminal of the NMOS transistor is connected to the resistor, and wherein the second capacitor is connected in parallel with the LED load.

18. The dimmable driver circuit of claim 15, wherein the AC input voltage has a voltage range between 90V and 120V, and wherein the dimmable driver circuit does not include a bleeder resistor that is coupled in parallel with the DC voltage.

* * * * *